J. A. BILZ.
Sulkeys.

No. 133,401.  Patented Nov. 26, 1872.

Witnesses  Inventor

UNITED STATES PATENT OFFICE.

JOHN ADOLF BILZ, OF PLEASANTON, CALIFORNIA.

IMPROVEMENT IN SULKIES.

Specification forming part of Letters Patent No. 133,401, dated November 26, 1872.

*To all whom it may concern:*

Be it known that I, JOHN A. BILZ, of Pleasanton, Alameda county, State of California, have invented an Improved Sulky; and I do hereby declare the following description and accompanying drawing are sufficient to enable any person skilled in the art or science to which it most nearly appertains to make and use my said invention or improvements without further invention or experiment.

My invention relates to improvements in sulkies or one-horse gigs; its object being to attach the seat to the axle in such a manner as to avoid the forward-and-back or bobbing movement of the rider which is caused by the ordinary seat attachment, and thus render riding in this class of vehicles much more pleasant.

Figure 1:
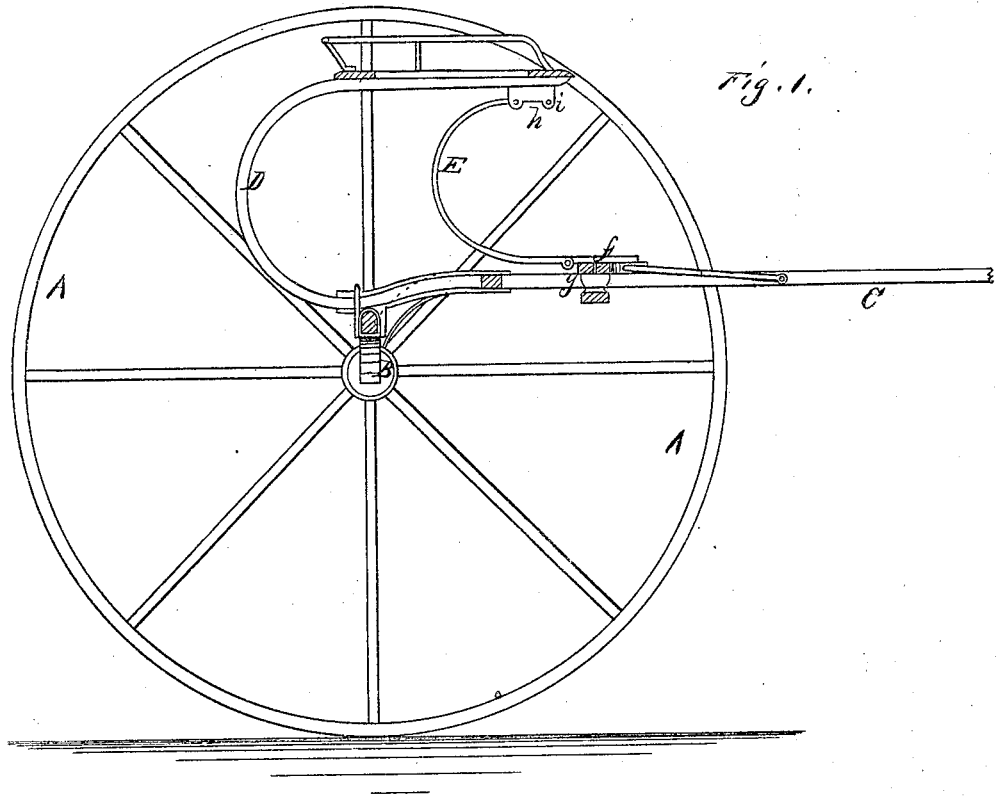
Figure 2:
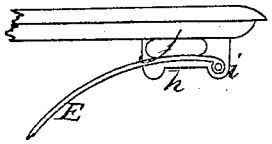

Referring to the accompanying drawing, Figure 1 is a side elevation of my invention. Fig. 2 is a view showing the rubber cushion.

A represents the wheels, and B the axle of any sulky or two-wheeled vehicle. C C are the shafts, which are attached in the ordinary way to the axle. D D are two curved springs, which are bent in the form of a C, one end of each of which is secured to the axle, while the opposite ends support the rear of the seat, being rigidly secured to it. This spring can be made of wood or metal, but I prefer wood. The front of the seat is supported by metal springs E, which are also bent to the form of a C. The lower ends of these springs are attached to a plate, *f*, by a joint, and the plate *f* is fixed to the cross-bar *g* of the shafts. The upper ends pass through a projecting lug, *h*, which depends from the bottom of the seat and is attached forward of this lug by a hinged joint at *i* to the front of the seat. A block of India rubber or other elastic substance, *j*, is fitted between the end of the spring E and the bottom of the seat, which gives a long elastic bearing for the spring, by which it is relieved from sudden shocks or strains. By this means I provide an easy-riding sulky-seat, in which the weight of the rider is thrown principally upon the axle instead of upon the shafts in the ordinary way.

Having thus described my invention, what I claim, and desire to secure by Letters Patent, is—

1. The wooden C-springs D for supporting the rear of the seat, in combination with the metal C-springs E for supporting the front of the seat, whereby the principal weight of the driver is thrown upon the axle, substantially as described.

2. The metal C-spring E loosely connected at its lower end to the plate *f*, and having its upper end hinged to the projecting lug *h*, substantially as and for the purpose above described.

3. The metal C-spring E, when hinged to the under side of the seat and also to the plate *f*, in combination with the elastic block or cushion *j*, substantially as and for the purpose above described.

In witness whereof I hereunto set my hand and seal.

JOHN ADOLF BILZ. [L. S.]

Witnesses:
GEORGE A. BEEBE,
I. C. MYER.